(12) United States Patent
Keller et al.

(10) Patent No.: US 9,926,649 B2
(45) Date of Patent: *Mar. 27, 2018

(54) CARBON NANOTUBE FIBERS/FILAMENTS FORMULATED FROM METAL NANOPARTICLE CATALYST AND CARBON SOURCE

(71) Applicant: The United States of America, as represented by the Secretary of the Navy, Washington, DC (US)

(72) Inventors: Teddy M. Keller, Fairfax Station, VA (US); Matthew Laskoski, Springfield, VA (US)

(73) Assignee: The United States of America, as represent by the Secretary of the Navy, Washington, DC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/000,406

(22) Filed: Jan. 19, 2016

(65) Prior Publication Data

US 2016/0138199 A1 May 19, 2016

Related U.S. Application Data

(60) Division of application No. 13/525,620, filed on Jun. 18, 2012, now Pat. No. 9,255,003, which is a
(Continued)

(51) Int. Cl.
| | |
|---|---|
| *D01F 9/12* | (2006.01) |
| *D04H 1/4242* | (2012.01) |
| *D01F 1/02* | (2006.01) |
| *D01F 9/127* | (2006.01) |
| *D01F 9/14* | (2006.01) |
| *C01B 32/16* | (2017.01) |

(Continued)

(52) U.S. Cl.
CPC ............... *D01F 9/12* (2013.01); *C01B 32/16* (2017.08); *D01F 1/02* (2013.01); *D01F 9/127* (2013.01); *D01F 9/14* (2013.01); *D04H 1/4242* (2013.01); *B82Y 40/00* (2013.01); *D01D 5/003* (2013.01); *Y10T 442/60* (2015.04); *Y10T 442/658* (2015.04)

(58) Field of Classification Search
CPC .............. H01F 1/42; D04H 13/00; B22F 9/16
USPC ......................................................... 75/252
See application file for complete search history.

(56) References Cited

U.S. PATENT DOCUMENTS

| | | | | |
|---|---|---|---|---|
| 6,846,345 B1 * | 1/2005 | Keller | ...................... | B01J 23/89 428/402 |
| 7,819,938 B2 * | 10/2010 | Keller | ................... | B22F 1/0018 75/252 |
| 8,222,403 B2 * | 7/2012 | Laskoski | ................ | B82Y 25/00 524/431 |

* cited by examiner

*Primary Examiner* — Jie Yang
(74) *Attorney, Agent, or Firm* — US Naval Research Laboratory; Joseph T. Grunkemeyer (57) ABSTRACT

Disclosed is a method of: providing a mixture of a polymer or a resin and a transition metal compound, producing a fiber from the mixture, and heating the fiber under conditions effective to form a carbon nanotube-containing carbonaceous fiber. The polymer or resin is an aromatic polymer or a precursor thereof and the mixture is a neat mixture or is combined with a solvent. Also disclosed are a carbonaceous fiber or carbonaceous nanofiber sheet having at least 15 wt. % carbon nanotubes, a fiber or nanofiber sheet having the a polymer or a resin and the transition metal compound, and a fiber or nanofiber sheet having an aromatic polymer and metal nanoparticles.

16 Claims, 4 Drawing Sheets

Related U.S. Application Data continuation of application No. 13/188,720, filed on Jul. 22, 2011, now abandoned, which is a continuation-in-part of application No. 13/020,887, filed on Feb. 4, 2011, now Pat. No. 8,277,534.

(60) Provisional application No. 61/301,279, filed on Feb. 4, 2010.

(51) Int. Cl.
*B82Y 40/00* (2011.01)
*D01D 5/00* (2006.01)

CARBON NANOTUBE FIBERS/FILAMENTS FORMULATED FROM METAL NANOPARTICLE CATALYST AND CARBON SOURCE

This application is a divisional application of U.S. patent application Ser. No. 13/525,620, filed on Jun. 18, 2012, which is a continuation application of U.S. patent application Ser. No. 13/188,720, filed on Jul. 22, 2011, which is a continuation-in-part application of U.S. patent application Ser. No. 13/020,887, filed on Feb. 4, 2011, which claims the benefit of U.S. Provisional Application No. 61/301,279, filed on Feb. 4, 2010. These applications and all other publications and patent documents referred to throughout this nonprovisional application are incorporated herein by reference.

TECHNICAL FIELD

The present disclosure is generally related to fibers containing carbon nanotubes.

DESCRIPTION OF RELATED ART

High-performance synthetic fibers have been under development for the past half century, motivated in particular by the high strength and stiffness of the covalent carbon-carbon bond and by the ability to achieve alignment with the fiber axis where they are in the form of polymer molecules or graphene sheets. Optimally, one may maximize the number of covalently bonded carbon atoms per unit volume or mass (high average molecular weight) and thus other types of atoms or groups attached to polymer chains will tend to reduce ultimate properties. An advantage of pure carbon fibers is that the mechanical properties are derived from the in-plane stiffness and strength of graphene sheets, without the adulterating effect of additional atoms to satisfy available carbon bonds. However, the route to carbon fibers involves the alignment of precursor structures, which are then covalently bonded to each other to create the final structure. Carbon fibers are thus comparatively brittle, especially when they are heat treated above 1500° C. to maximize stiffness. The very high axial strength and stiffness of individual carbon nanotubes opens up the possibility of processing them directly into continuous fibers. Thus, the benefits of high-performance polymeric fibers, especially directness of processing and fiber toughness, can be combined with the advantages of nanofibers consisting of carbon atoms. The processing routes developed so far to incorporate CNTs into polymeric fibers borrow concepts from polymer fiber processing technologies.

Polyacrylonitrile (PAN), petroleum pitch, and cellulosic fibers are typically used as carbon fiber precursors. Other high temperature polymers have also been used. Currently, PAN is the precursor of choice. For converting PAN to carbon and carbon nanotube fibers, thermo-oxidative stabilization typically in the 200-300° C. range is a key step. The PAN fibers are fed through a series of specialized ovens during the time-consuming oxidative stage. The process combines oxygen molecules from the air with the PAN fibers in the warp and causes the polymer chains to start crosslinking. The crosslinked fibers then have a definite shaped (will not soften) and are then carbonized under inert conditions typically between 700 and ends in a high temperature furnace at 1200° C. to 1500° C. While dwell times are sometimes proprietary, oxidative dwell time is measured in hours, while carbonization is an order of magnitude shorter, measured in minutes. As the fiber is carbonized, it loses weight and volume, contracts by 5 to 10 percent in length and shrinks in diameter.

There are two main methods for fiber production, namely, liquid and solid state spinning. Both methods have been developed for CNT-based fibers. Increased thermal stability, glass transition temperature, and storage modulus have been reported with the incorporation of carbon nanotubes in various polymer matrices. Poly(p-phenylene benzobisoxazole) (PBO)/CNT composite fibers containing 10 wt-% CNTs exhibited 50% higher tensile strength compared to the controlled PBO fiber. Polyacrylonitrile (PAN) copolymers are commercially important and are used as carbon fiber precursors as well as for the development of porous and activated carbon for a variety of applications. Films have been made from PAN/MWNT homogeneous dispersions. The CNTs can be dispersed in solvents such as dimethylformamide (DMF) and dimethylacetamide (DMAC). Carbonized and activated PAN/CNT films are very promising for supercapacitor electrode applications. Solution spun PAN/CNT fibers containing 10 wt-% nanotubes exhibit a 100 percent increase in tensile modulus at room temperature, a significant reduction in thermal shrinkage, and a 40° C. increase in the glass transition temperature. These observations provide evidence of the interaction between PAN and the CNTs.

One parameter in making high-strength fibers from carbon nanotubes is the availability of nanotubes which are as long and as structurally perfect as possible. Another parameter is to align all nanotubes as perfectly as possible with the fiber axis, so as to maximize the translation of their axial properties to those of the fiber. The bonding between adjacent nanotubes is weak in shear (graphite is a lubricant) and thus as great a contact length as possible is necessary to transfer the load into any given nanotube. Another advantage of thin walled nanotubes (single or double) is that they tend to facet or flatten so to maximize their contact area. Alignment is typically achieved through mechanical forces whether applied to a partly linked array of fibers or through fluid-flow forces on a lyotropic suspension.

Today, there is currently an intense effort throughout the scientific community to efficiently disperse MWNTs into polymeric fibers to take advantage of the exceptional mechanical properties of carbon nanotubes. Moreover, various research groups have used aerogels and fuming sulfuric acid to utilize the CNTs grown by chemical vapor deposition (CVD) in the formation of CNT containing fibers. Carbon fibers derived from polyacrylonitrile (PAN) have been the dominant reinforcement in advanced composites since their commercialization in the late 1960s. By using a resin such as PAN, which can be spun into a fiber, cured, and then carbonized, the formation of CNT fibers can be exploited using the NRL breakthrough method for the formation of CNTs by heating the PAN or other carbon sources in the presence of small metal nanoparticles that may be magnetic in nature.

BRIEF SUMMARY

Disclosed herein is a method comprising: providing a mixture of a polymer or a resin and a transition metal compound, producing a fiber from the mixture, and heating the fiber under conditions effective to form a carbon nanotube-containing fiber. The polymer or resin is an aromatic polymer or a precursor thereof and the mixture is a neat mixture or is combined with a solvent.

Also disclosed herein is a fiber or nanofiber sheet comprising at least 15 wt. % carbon nanotubes.

Also disclosed herein is a fiber or nanofiber sheet comprising a mixture of: a polymer or a resin, as described above, and a transition metal compound.

Also disclosed herein is a fiber or nanofiber sheet comprising: an aromatic polymer and metal nanoparticles.

BRIEF DESCRIPTION OF THE DRAWINGS

A more complete appreciation of the disclosure will be readily obtained by reference to the following Description of the Example Embodiments and the accompanying drawings.

DETAILED DESCRIPTION OF EXAMPLE EMBODIMENTS

In the following description, for purposes of explanation and not limitation, specific details are set forth in order to provide a thorough understanding of the present disclosure. However, it will be apparent to one skilled in the art that the present subject matter may be practiced in other embodiments that depart from these specific details. In other instances, detailed descriptions of well-known methods and devices are omitted so as to not obscure the present disclosure with unnecessary detail.

A high-yield method has been developed for the production of carbon nanotubes (CNTs) and carbon nanotube-magnetic metal nanoparticle compositions in a bulk carbonaceous solid. The yield of CNT formation can be controlled as a function of the carbonization temperature and exposure time at elevated temperatures. With this method, CNTs are formed in a bulk carbonaceous solid from thermal decomposition of various amounts of an organometallic compound and/or metal salts in the presence of an excess amount of a carbon source such as selected highly aromatic compounds. Only a small amount of the organometallic compound or metal salt is needed to achieve the formation of CNTs in high yield, but larger quantities of the metal source can also be incorporated, if desired.

The disclosed process is concerned with the formation of neat aligned CNT fibers from precursor compositions formulated from (1) a carbon source such as polyacrylonitrile (PAN) or copolymers thereof, pitch-based compounds, high temperature compounds or resins that char and (2) a metal salt(s) and/or organometallic compound(s). The spinning of fibers occurs from the precursor compositions either melted or dissolved or dispersed in a dipolar aprotic solvent, and thermal treatment of the precursor composition resulting in the decomposition of the metal salt and/or organometallic compounds into metal nanoparticles that behave as the catalyst for the formation of the CNTs. Heat treatment at, for example, 200-400° C. is important to convert the polymeric fibers to a form with retention of structural integrity for heating to elevated temperatures and for conversion of the fibers above, for example, 500° C. to metal nanoparticle/carbon nanotube fibers during a carbonization process. The carbonization process to form the carbon nanotube fibers occurs in temperature steps from, for example, about 600° C. to 1500° C. The property of the carbon nanotube fibers will depend on the heat treatment.

The process may result in the high-yield formation of multi-walled carbon nanotubes (MWNTs) in the solid carbonaceous domain upon heat treatment to elevated temperatures under ambient pressure. The method permits the large-scale inexpensive production of MWNTs in a shaped, solid configuration. The MWNTs are formed under atmospheric pressure during the carbonization process above 500° C. in the carbonaceous solid. The catalytic metal atoms, nanoclusters, and/or nanoparticles formed from the decomposition of the organometallic compound or metal salt are the key to the formation of the carbon nanotubes in the developing carbonaceous nanomaterial by reacting with the developing polycondensed aromatic ring system. To date, the average size as determined by X-ray diffraction studies are 5-30 nm. Small metal nanoparticles (1-3 nm) could produce single-walled carbon nanotubes. The composition can be tailored to have mainly CNTs or varying amounts of CNTs and magnetic metal nanoparticles, as formed. Shaped solid forms, films, and fibers/rods can be readily formulated from the precursor mixtures. If desired, CNT-containing powders can be obtained by milling of the carbonaceous solid. The CNT content of the bulk solid can be controlled by the final pyrolysis temperature. For example, a final pyrolysis temperature of 800° C. and 1300° C. may afford a CNT content of approximately 20 and 70 wt. %, respectively. A suitable range of pyrolysis temperatures includes, but is not limited to, 600-2700° C.

The initial fiber form of the initial materials may be made by a variety of methods that are known in the art including, but not limited to, spinning with a spinneret, electro spinning, solvent precipitation, and physically pulling a fiber from a mixture of the materials. A variety of such methods are described in U.S. Provisional Application No. 61/301,279. The materials may be mixed neat in the melt or liquid state, or mixed or dissolved in a solvent. When the precursor composition is completely dissolved in a solvent, it can help to ensure that metal salt(s) and/organometallic compounds are deposited within the spun polymeric fibers. The fiber is a threadlike material and may have the same dimensions as is typical for other carbon fibers.

The polymer or resin may be dissolved in a solution simultaneously, before, or after dissolving the transition metal compound. The transition metal compound may be dissolved close in time to the production of the fiber from the same solution. This may be done to avoid decomposition of certain transition metal compounds, such as $Co_2(CO)_8$. Such decomposition may occur gradually over time, particularly if exposed to air or elevated temperatures. The fibers may be produced when at least 50%, 70%, or 90% of the original amount of the transition metal compound still remains in the solution without having decomposed. For example, the solution may be spun into fibers within 30 days of dissolving the transition metal compound in the solution. A polar aprotic solvent may be used for dissolving both components. Such solvents are known in the art and include, but are not limited to, dimethylacetamide, dimethylformamide, dimethyl sulfoxide, and N-methylpyrrolidone. Any concentration of transition metal compound that results in the formation of carbon nanotubes may be used, including concentrations higher and lower than used in the examples below.

Suitable carbon sources include aromatic polymers and precursors thereof. The polymer may be a crosslinked or thermoset polymer, with the crosslinking occurring during or after formation of the fiber. The aromatic polymer may be an aromatic phthalonitrile polymer or oligomer, or a thermoset thereof, such as a phthalonitrile oligomer made from bisphenol A and benzophenone. A precursor is a compound or material that can be converted to an aromatic polymer or material by heating before forming the CNTs. Such heating may be in oxygen, including atmospheric air. The heating may be, for example, from 200-300° C. When heated in this way, PAN converts to an aromatic polymer as the side groups form rings. Pitch resins such as coal pitch (coal tar pitch), petroleum pitch, or synthetic pitches also form aromatic materials. Other suitable carbon sources include any aromatic material, or material that converts to an aromatic, that forms a char when heated in an inert atmosphere. Such materials and their products are disclosed in U.S. Pat. Nos. 6,673,953; 6,770,583; 6,846,345; 6,884,861; and 7,819,938.

The transition metal compound may be, for example, a metal salt or an organometallic compound. Such compounds can decompose at elevated temperatures to form metal nanoparticles. Such suitable compounds include, but are not limited to, octacarbonyldicobalt, 1-(ferrocenylethynyl)-3-(phenylethynyl)benzene, diironnonacarbonyl, and bis(1,5-cyclooctodiene)nickel(0).

The small metal nanoparticles, formed by thermal degradation/decomposition of the metal salt(s) and/or organometallic compounds, are responsible for the formation of the CNTs within the carbonized fiber upon heat treatment to elevated temperatures. The precursor polymeric fibers (carbon source and metal salt) may be carbonized by the simple carbonization process already used to produce carbon and graphitic fibers.

The precursor compositions such as polyacrylonitrile, phthalonitriles, petroleum pitches, etc. and metal salts and/or organometallic compound are mixed and heated to cause the decomposition of the metal component into metal atoms, clusters, and/or metal nanoparticles (controlling the metal particle size to less than 25 nm). The small metal nanoparticles are responsible for and catalyze the formation of the CNTs. Large metal nanoparticles larger than 40 nm in size may afford graphite; thus it may be important to keep the metal catalyst at much smaller sizes. Stretching may help to align the molecules within the small diameter sized fibers and provides the basis for the formation of the tightly bonded carbon crystals after carbonization and the means for aligning the CNTs within the fibers.

Figure 1:
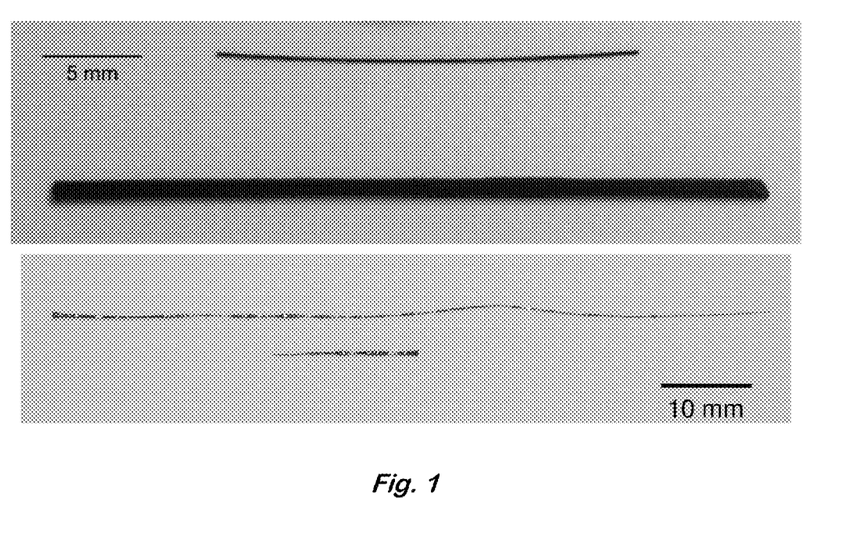
FIG. 1 shows photographs of large CNT-containing fibers and rods formulated from PAN and phthalonitrile, respectively.

Carbon nanotube fibers may be fabricated by injecting a solution of a precursor composition formulated from a carbon source-metal salt and/organometallic compound into a protic solvent such as water, by drawing from the melt of a B-staged thermoset resin at elevated temperatures or by conventional spinning techniques of a carbon precursor followed by carbonization of the polymeric fibers formed by the listed methods of preparation. In an effort to develop a method for the fabrication of CNT fibers formulated directly from the precursor carbon material, experiments have been conducted whereby fibers were drawn from the melt of a $Fe_2(CO)_9$/phthalonitrile precursor composition and by the deposition of a fiber into water from a solution of $Fe_2(CO)_9$/polyacrylonitrile (PAN) and a dipolar aprotic solvent. The polymeric fibers were used in the direct formation of the carbon nanotube (MWNT) fibers by slowly heating to 1000° C. under inert conditions. Studies show that any CNT precursor composition formulation from a carbon source and a metal salt(s) and/or organometallic compound that can be spun or drawn into a fiber and carbonized by the method can be converted into carbon nanotube fibers. There are no known prior reports of the ability to achieve the direct formation of CNT fibers using a simple carbonization process from precursor materials such as PAN and petroleum pitches that are currently used to form carbon and graphitic fibers. To show the feasibility of forming CNT fibers, large diameter fibers and rods were formed from a phthalonitrile oligomer and PAN and converted into CNT large fibers and rods (see FIG. 1).

Figure 2:
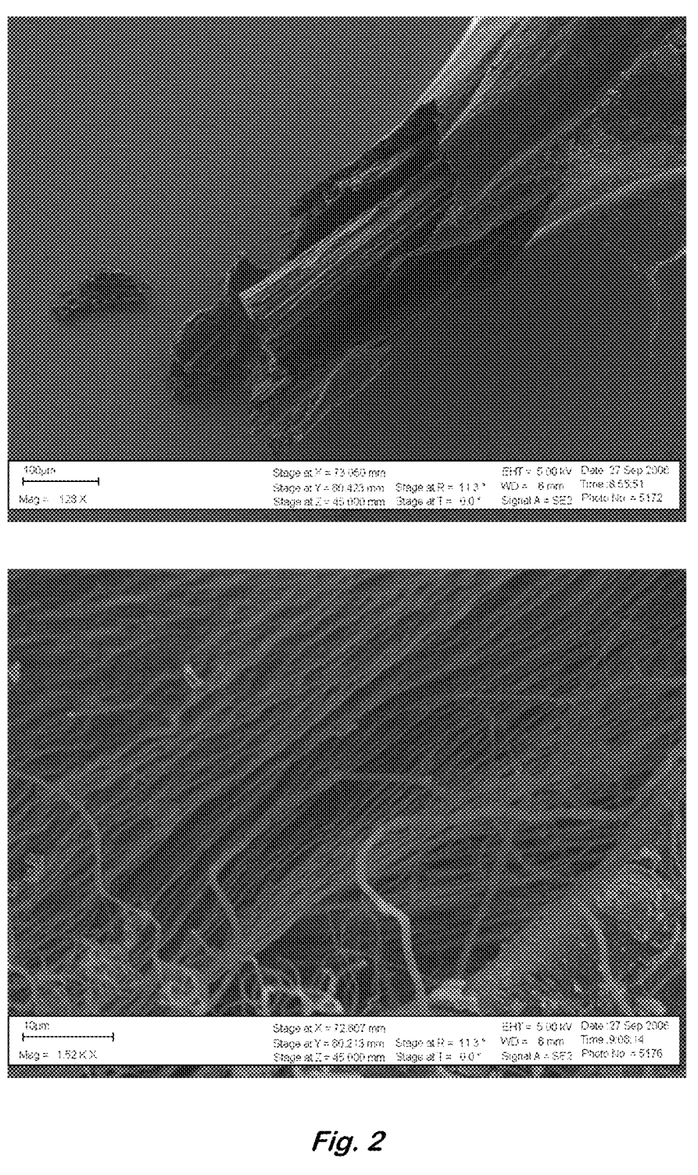
FIGS. 2 and 3 show SEM images showing the crude fibers and the CNTs appearing somewhat aligned within the fibers.
Figure 3:
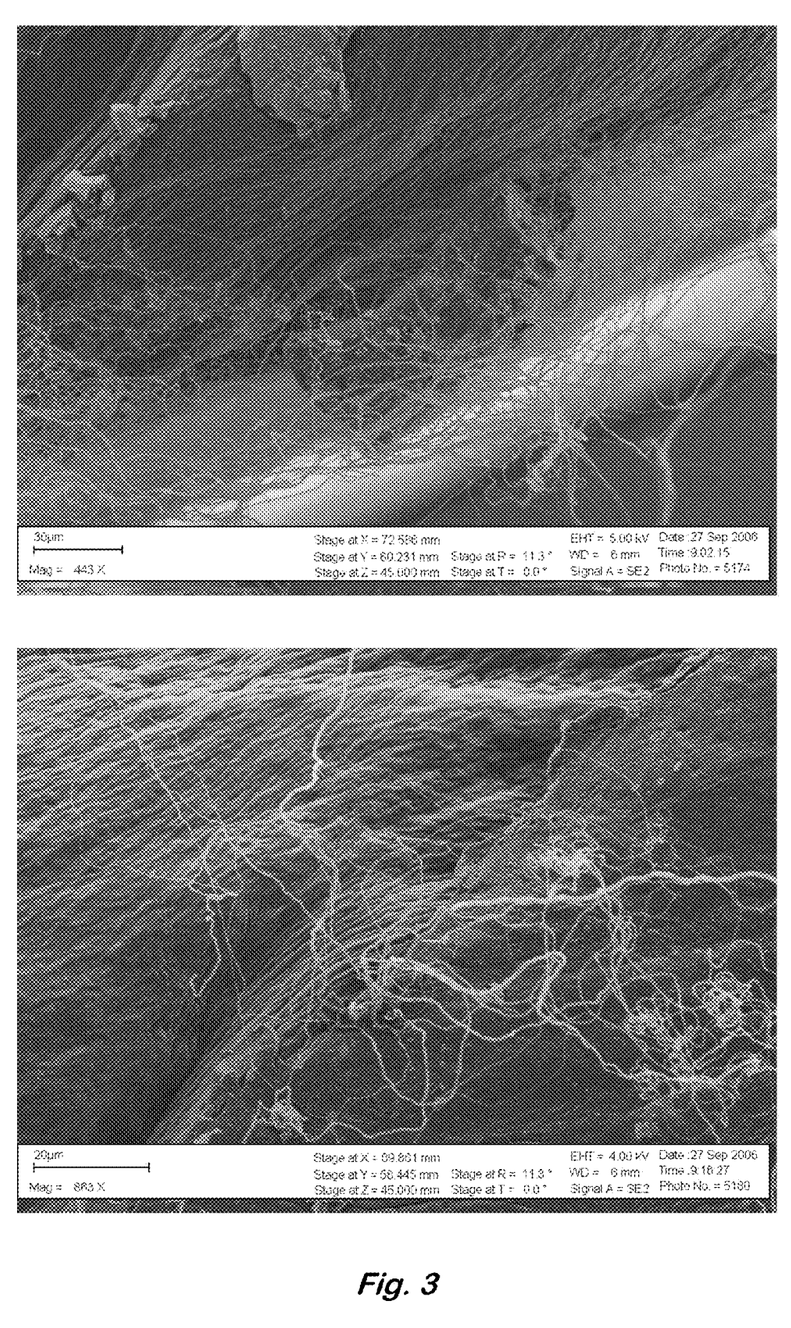
Figure 4:
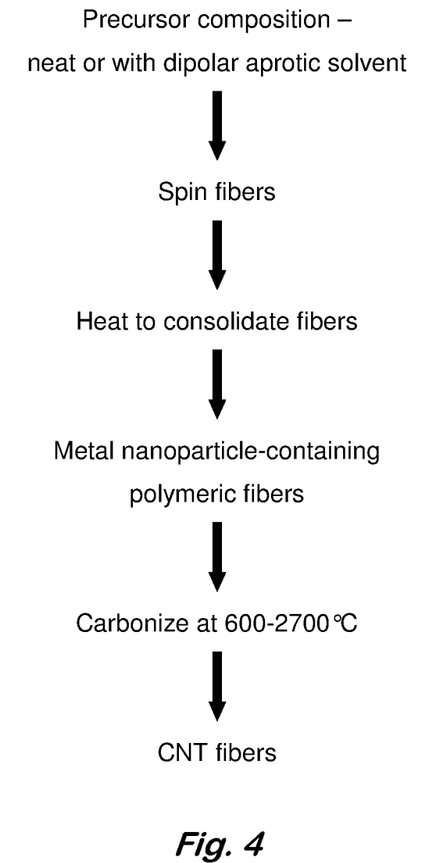
FIG. 4 shows a synthetic scheme for an embodiment of the method.

Since the formation of CNTs can occur directly from a mixture of a metal salt such as $Fe_2(CO)_9$, $Co_2(CO)_8$, and nickel(cyclooctadiene) and carbon sources such as PAN or phthalonitriles in a shaped composition including large diameter fibers and rods, these precursor compositions are suitable candidates to spin polymeric fibers that can be directly converted into MWNT-fibers during the carbonization process. The fibers may also contain various quantities of magnetic metal nanoparticles depending upon the initial concentration of the metal salt(s) or organometallic compound(s) in the precursor composition. The photographs (see FIG. 1) show carbon nanotube fibers obtained from PAN (top) and phthalonitrile (bottom). Upon cure and carbonization of the polymeric fibers, x-ray diffraction (XRD) and transmission electron microscopy (TEM) studies confirmed the presence of copious amounts of MWNTs in the carbonized fibers. Scanning electron microscopy (SEM) images (see FIGS. 2 and 3) show that the CNTs can be potentially aligned within small diameter sized fibers (micron- and nanometer-sized fibers). No stretching of the fibers/rod was performed during these experiments.

The formation and heat treatment of the fibers may be similar to method known in the art for that of the same materials in the absence of the transition metal compound. A variety of such methods are described in U.S. Provisional Application No. 61/301,279.

The resulting fiber may have at least 5, 10, 15, 20, 25, 30, 35, 40, 45, 50, 55, 60, 65, 70, 75, or 80 wt. % CNTs. The CNTs may be generally aligned parallel with each other and the length of the fiber. The fiber may also contain metal nanoparticles. However, if heated to a high enough temperature the metal nanoparticles may be removed. These properties also apply to nanofiber sheets.

Many potential applications have been proposed for carbon nanotubes, including conductive and high-strength composites; energy storage and energy conversion devices; sensors; field emission displays and radiation sources; hydrogen storage media; and nanometer-sized semiconductor devices, probes, high electrical current flow, and interconnects. Some of these applications are now realized in products. Another potential application is use is in garments, such as anti-ballistic and decontamination garments. The small diameter sized, high surface area CNT fibers would be expected to exhibit superior mechanical, electrical, magnetic, catalytic, and optical properties. Potential payoffs and impact areas of the CNT fibers include structural, motor/generator, energy (fuel cell electrodes, Li-batteries, hydrogen storage, and electricity carrier—electrically conductive carbon nanotubes), membrane for water purification, air filtration (toxin removal), and various catalytic applications. Metal nanoparticles also present in the fibers could be of importance for many of these applications.

The following examples are given to illustrate specific applications. These specific examples are not intended to limit the scope of the disclosure in this application.

Example 1

Synthesis of 1/20 by Weight
Octacarbonyldicobalt/Polyacrylonitrile Mixture $Co_2(CO)_8$ (50 mg, 0.146 mmol), polyacrylonitrile ("PAN") (1.00 g) and 10 mL of methylene chloride were added to a 50 mL round bottomed flask. The $Co_2(CO)_8$ readily dissolved in the methylene chloride. The PAN did not dissolve. The slurry was allowed to stir for 5 min before the solvent was removed under reduced pressure. The mixture was vacuum dried and isolated as an off-white solid.

Example 2

Thermal Conversion of 1/20 by Weight $Co_2(CO)_8$/PAN Mixture to Carbon Nanotube-Cobalt Nanoparticle Composition by Heating to 1000° C.

A sample of the mixture from Example 1 (22.8 mg) was heated in a TGA chamber under nitrogen at 10° C./min to 1000° C. resulting in a shaped composition and a char yield of 36%. The DTA curve showed an exotherm at 308° C. X-ray studies confirmed the presence of carbon nanotubes-cobalt nanoparticles in the carbon composition. The x-ray diffraction study showed the four characteristic reflection values [(002), (100), (004), and (110)] for carbon nanotubes and the pattern for fcc-cobalt nanoparticles. The x-ray (002) reflection for carbon nanotubes was readily apparent.

Example 3

Thermal Conversion of 1/20 by Weight $Co_2(CO)_8$/PAN Mixture to Carbon Nanotube-Cobalt Nanoparticle Composition by Heating to 1500° C.

A sample of the mixture from Example 1 (21.5 mg) was heated in a TGA chamber under nitrogen at 10° C./min to 1500° C. resulting in a shaped composition and a char yield of 32%. The DTA curve showed an exotherm at 310° C. X-ray studies confirmed the presence of carbon nanotubes-cobalt nanoparticles in the carbon composition. The x-ray diffraction study showed the four characteristic reflection values [(002), (100), (004), and (110)] for carbon nanotubes and the pattern for fcc-cobalt nanoparticles. The x-ray (002) reflection for carbon nanotubes was readily apparent.

Example 4

Pre-Oxidation and Thermal Conversion of 1/20 by Weight $Co_2(CO)_8$/PAN Mixture to Carbon Nanotube-Cobalt Nanoparticle Composition A sample of the mixture prepared as in Example 1 (25.52 mg) was heated in a TGA chamber at 10° C./min to 280° C. under air and isothermed for 1.5 hr. The resulting air stabilized solid was further heated at 10° C./min to 1000° C. under nitrogen resulting in a shaped composition and an overall char yield of 45%. X-ray studies confirmed the presence of carbon nanotubes-cobalt nanoparticles in the carbon composition. The x-ray diffraction study showed the four characteristic reflection values [(002), (100), (004), and (110)] for carbon nanotubes and the pattern for fcc-cobalt nanoparticles. The x-ray (002) reflection for carbon nanotubes was readily apparent.

Example 5

Synthesis of 1/40 by Weight $Co_2(CO)_8$/PAN Mixture $Co_2(CO)_8$ (20 mg, 0.0584 mmol), PAN (1.00 g) and 10 mL of methylene chloride were added to a 50 mL round bottomed flask. The $Co_2(CO)_8$ readily dissolved in the methylene chloride. The PAN did not dissolve. The slurry was allowed to stir for 5 min before the solvent was removed under reduced pressure. The mixture was vacuum dried and isolated as an off-white solid.

Example 6

Thermal Conversion of 1/40 by Weight $Co_2(CO)_8$/PAN Mixture to Carbon Nanotube-Cobalt Nanoparticle Composition by Heating to 1000° C. and 1400° C.

Sample of the mixture from Example 5 (25.04 mg and 30.26 mg) were heated in a TGA chamber under nitrogen at 10° C./min to 1000° C. and 1400° C. resulting in a shaped composition and char yields of 37% and 34%, respectively. The DTA curve showed an exotherm at 304° C. X-ray studies confirmed the presence of carbon nanotubes-cobalt nanoparticles in the carbon composition. The x-ray diffraction studies showed the four characteristic reflection values [(002), (100), (004), and (110)] for carbon nanotubes and the pattern for fcc-cobalt nanoparticles. The x-ray (002) reflection for carbon nanotubes was readily apparent.

Example 7

Pre-Oxidation and Thermal Conversion of 1/40 by Weight $Co_2(CO)_8$/PAN Mixture to Carbon Nanotube-Cobalt Nanoparticle Composition A sample of the mixture prepared as in Example 5 (26.75 mg) was heated in a TGA chamber at 10° C./min to 280° C. under air and isothermed for 1.5 hr. The resulting air stabilized solid was further heated at 10° C./min to 1000° C. under nitrogen resulting in a shaped composition and an overall char yield of 47%. X-ray studies confirmed the presence of carbon nanotubes-cobalt nanoparticles in the carbon composition. The x-ray diffraction study showed the four characteristic reflection values [(002), (100), (004), and (110)] for carbon nanotubes and the pattern for fcc-cobalt nanoparticles. The x-ray (002) reflection for carbon nanotubes was readily apparent.

Example 8

Synthesis of 1/100 by Weight $Co_2(CO)_8$/PAN Mixture $Co_2(CO)_8$ (10 mg, 0.0292 mmol), PAN (1.00 g) and 10 mL of methylene chloride were added to a 50 mL round bottomed flask. The $Co_2(CO)_8$ readily dissolved in the methylene chloride. The PAN did not dissolve. The slurry was allowed to stir for 5 min before the solvent was removed under reduced pressure. The mixture was vacuum dried and isolated as an off-white solid.

Example 9

Thermal Conversion of 1/100 by Weight $Co_2(CO)_8$/PAN Mixture to Carbon Nanotube-Cobalt Nanoparticle Composition by Heating to 1000° C.

A sample of the mixture from Example 8 (25.32 mg) was heated in a TGA chamber under nitrogen at 10° C./min to 1000° C. resulting in a shaped composition and a char yield of 35%. The DTA curve showed an exotherm at 295° C. X-ray studies confirmed the presence of carbon nanotubes-cobalt nanoparticles in the carbon composition. The x-ray diffraction studies showed the four characteristic reflection values [(002), (100), (004), and (110)] for carbon nanotubes and the pattern (small intensity) for fcc-cobalt nanoparticles. The x-ray (002) reflection for carbon nanotubes was readily apparent.

Example 10

Synthesis of 1/20 by Weight 1-(Ferrocenylethynyl)-3-(Phenylethynyl)Benzene/PAN Mixture 1-(Ferrocenylethynyl)-3-(phenylethynyl)benzene (10 mg, 0.0259 mmol), PAN (500 mg) and 10 mL of methylene chloride were added to a 50 mL round bottomed flask. The 1-(ferrocenylethynyl)-3-(phenylethynyl)benzene readily dissolved in the methylene chloride. The PAN did not dissolve. The slurry was allowed to stir for 10 min before the solvent was removed under reduced pressure. The mixture was vacuum dried and isolated as an orange solid.

Example 11

Thermal Conversion of 1/20 by Weight 1-(Ferrocenylethynyl)-3-(Phenylethynyl)-Benzene/PAN Mixture to Carbon Nanotube-Iron Nanoparticle Composition by Heating to 1000° C. and 1500° C.

Samples of the mixture from Example 10 (30.26 mg and 32.56 mg) were heated in a TGA chamber under nitrogen at 10° C./min to 1000° C. and to 1500° C. resulting in a shaped composition and char yields of 33% and 30%, respectively. The DTA curves showed an exotherm at 297° C. X-ray studies confirmed the presence of carbon nanotubes-iron nanoparticles in the carbon compositions. The x-ray diffraction studies showed the four characteristic reflection values [(002), (100), (004), and (110)] for carbon nanotubes and the pattern for bcc-iron nanoparticles. The x-ray (002) reflection for carbon nanotubes was readily apparent.

Example 12

Pre-Oxidation and Thermal Conversion of 1/20 by Weight 1-(Ferrocenylethynyl)-3-(Phenylethynyl)-Benzene/PAN Mixture to Carbon Nanotube-Iron Nanoparticle Composition by Heating to 1000° C. and 1500° C.

Samples of the mixture from Example 10 (35.46 mg and 38.87 mg) were heated in a TGA chamber at 10° C./min to 280° C. under air and isothermed for 3.5 hr. The air stabilized samples were then heated under nitrogen at 10° C./min to 1000° C. and to 1500° C. resulting in a shaped composition and char yields of 48% and 45%, respectively. X-ray studies confirmed the presence of carbon nanotubes-iron nanoparticles in the carbon compositions. The x-ray diffraction studies showed the four characteristic reflection values [(002), (100), (004), and (110)] for carbon nanotubes and the pattern for bcc-iron nanoparticles. The x-ray (002) reflection for carbon nanotubes was readily apparent.

Example 13

Synthesis of 1/20 by Weight Diironnonacarbonyl/PAN Mixture $Fe_2(CO)_9$ (250 mg, 0.688 mmol), PAN (5.00 g) and 10 mL of methylene chloride or acetone were added to a 50 mL round bottomed flask. The $Fe_2(CO)_9$ readily dissolved in the methylene chloride or acetone. The PAN did not dissolve. The slurry was allowed to stir for 15 min before the solvent was removed under reduced pressure. The mixture was vacuum dried and isolated as an orange solid.

Example 14

Thermal Conversion of 1/20 by Weight $Fe_2(CO)_9$/PAN Mixture to Carbon Nanotube-Iron Nanoparticle Composition by Heating to 1000° C.

A sample of the mixture from Example 13 (25.11 mg) was heated in a TGA chamber under nitrogen at 10° C./min to 1000° C. resulting in a shaped composition and a char yield of 36%. The DTA curve showed an exotherm at 308° C. X-ray studies confirmed the presence of carbon nanotubes-iron nanoparticles in the carbon composition. The x-ray diffraction studies showed the four characteristic reflection values [(002), (100), (004), and (110)] for carbon nanotubes and the pattern for bcc-iron nanoparticles. The x-ray (002) reflection for carbon nanotubes was readily apparent.

Example 15

Thermal Conversion of 1/20 by Weight $Fe_2(CO)_9$/PAN Mixture to Carbon Nanotube-Iron Nanoparticle Composition by Heating to 1500° C.

A sample of the mixture from Example 13 (21.8 mg) was heated in a TGA chamber under nitrogen at 10° C./min to 1500° C. resulting in a shaped composition and a char yield of 32%. The DTA curve showed an exotherm at 310° C. X-ray studies confirmed the presence of carbon nanotubes-iron nanoparticles in the carbon composition. The x-ray diffraction studies showed the four characteristic reflection values [(002), (100), (004), and (110)] for carbon nanotubes and the pattern for bcc-iron nanoparticles. The x-ray (002) reflection for carbon nanotubes was readily apparent.

Example 16

Pre-Oxidation and Thermal Conversion of 1/20 by Weight $Fe_2(CO)_9$/PAN Mixture to Carbon Nanotube-Iron Nanoparticle Composition A sample of the mixture from Example 13 (50 mg) was heated in a TGA chamber at 10° C./min to 280° C. under air and isothermed for 2 hr. The resulting solid was further heated at 10° C./min to 1000° C. under nitrogen resulting in a shaped composition and an overall char yield of 40%. X-ray studies confirm the presence of carbon nanotubes-iron nanoparticles in the carbon composition. The x-ray diffraction studies showed the four characteristic reflection values [(002), (100), (004), and (110)] for carbon nanotubes and the pattern for bcc-iron nanoparticles. The x-ray (002) reflection for carbon nanotubes was readily apparent.

Example 17

Synthesis of 1/20 by Weight $Fe_2(CO)_9$/PAN Mixture by Adding $Fe_2(CO)_9$ Dropwise $Fe_2(CO)_9$ (750 mg, 2.06 mmol) in 10 mL of methylene chloride was added dropwise to a mixture of PAN (15.00 g) and 20 mL of methylene chloride in a 50 mL round bottomed flask. The $Fe_2(CO)_9$ readily dissolved in the methylene chloride. The PAN did not dissolve. The slurry was allowed to stir for 5 min before the solvent was removed under reduced pressure. The mixture was vacuum dried and isolated as an orange solid.

Example 18

Thermal Conversion of 1/20 by Weight $Fe_2(CO)_9$/PAN Mixture (Dropwise Addition of $Fe_2(CO)_9$) to Carbon Nanotube-Iron Nanoparticle Composition by Heating to 1500° C.

A sample of the mixture from Example 17 (75.6 mg) was heated in a TGA chamber under nitrogen at 10° C./min to 1500° C. resulting in a shaped composition and a char yield of 37%. The DTA curve showed an exotherm at 310° C. X-ray studies confirmed the presence of carbon nanotubes-iron nanoparticles in the carbon composition. The x-ray diffraction studies showed the four characteristic reflection values [(002), (100), (004), and (110)] for carbon nanotubes and the pattern for bcc-iron nanoparticles. The x-ray (002) reflection for carbon nanotubes was readily apparent.

Example 19

Synthesis of 1/20 Molar $Co_2(CO)_8$/Phthalonitrile Mixture

The phthalonitrile resin (a 2:1 oligomer of bisphenol A and benzophenone capped with phthalonitrile units, hereinafter "phthalonitrile") (200 mg, 0.225 mmol) was dissolved in 10 mL of methylene chloride in a 25 mL round bottomed flask. $Co_2(CO)_8$ (10 mg, 0.0292 mmol) dissolved in 2 mL of hexanes was added and a brown precipitate formed. The solvent was removed under reduced pressure, the mixture vacuum was dried, and the product was isolated as a dark brown solid.

Example 20

Thermal Conversion of 1/20 Molar $Co_2(CO)_8$/Phthalonitrile Mixture to Carbon Nanotube-Cobalt Nanoparticle Composition by Heating to 1000° C. and to 1500° C.

Samples of the mixture from Example 19 (38.01 mg and 33.75 mg) were heated in a TGA chamber under nitrogen at 10° C./min to 1000° C. resulting in a shaped composition and a char yield of 47%. The DTA curve showed exotherms at 163, 276, 514, and 868° C. X-ray studies confirmed the presence of carbon nanotubes-cobalt nanoparticles in the carbon composition. The x-ray diffraction studies showed the four characteristic reflection values [(002), (100), (004), and (110)] for carbon nanotubes and the pattern for fcc-cobalt nanoparticles. The x-ray (002) reflection for carbon nanotubes was readily apparent.

Example 21

Direct Formation of Fibers from Melt of 1/20 Molar $Co_2(CO)_8$/Phthalonitrile Mixture to Carbon Nanotube-Cobalt Nanoparticle Composition and Heating of Stabilized Fiber to 1000° C.

A sample (0.25 g) of the mixture from Example 19 was melted on a hot plate and heated at 330° C. to a viscous melt followed by the insertion of a glass rod into the sample and the upward drawing of fibers. The diameter of the fibers was controlled as a function of the rate of drawing of the fibers. The drawn fibers were cured or solidified by heating at 280° C. for 12 hr, 300° C. for 2 hr, 350° C. for 3 hr, and 375° C. to form a thermoset fiber, which was carbonized by heating at 2° C./min in a flow of nitrogen. Drawing the fibers at 325° C. permitted the retention of shape during the curing process. The x-ray diffraction and transmission electron microscopy (TEM) studies showed the presence of carbon nanotubes within the fibers.

Example 22

Thermal Conversion of 1/20 Molar $Co_2(CO)_8$/Phthalonitrile/Bis[4-(3-Aminophenoxy)Phenyl]Sulfone Mixture to Carbon Nanotube-Cobalt Nanoparticle Composition by Heating to 1000° C.

A samples of the mixture prepared as in Example 19 (100 mg) was mixed and melted with bis[4-(3-aminophenoxy) phenyl]sulfone (p-BAPS) (2 mg) at 180° C. The resulting mixture was cooled and a sample (61.75 mg) was cured under nitrogen in a TGA chamber by heating at 250° C. for 1 hr, 300° C. for 2 hr, 350° C. for 6 hr, and 375° C. for 4 hr. The shaped composition was cooled and a sample (84.65 mg) was heated under nitrogen at 10° C./min to 1000° C. resulting in a char yield of 67%. The DTA curve showed exotherms at 530 and 751° C. X-ray studies confirmed the presence of carbon nanotubes-cobalt nanoparticles in the carbon composition. The x-ray diffraction studies showed the four characteristic reflection values [(002), (100), (004), and (110)] for carbon nanotubes and the pattern for fcc-cobalt nanoparticles. The x-ray (002) reflection for carbon nanotubes was readily apparent.

Example 23

Thermal Conversion of 1/20 Molar $Co_2(CO)_8$/Phthalonitrile/p-BAPS Mixture to Carbon Nanotube-Cobalt Nanoparticle Composition by Heating to 1500° C.

A samples of the mixture prepared as in Example 19 (150 mg) was mixed and melted with p-BAPS (3 mg) at 180° C. The resulting mixture was cooled and a sample (75.23 mg) was cured under nitrogen in a TGA chamber by heating at 250° C. for 1 hr, 300° C. for 2 hr, 350° C. for 6 hr, and 375° C. for 4 hr. The shaped composition was cooled and a sample (65.24 mg) was heated under nitrogen at 10° C./min to 1000° C. resulting in a char yield of 67%. The DTA curve showed exotherms at 530 and 751° C. X-ray studies confirmed the presence of carbon nanotubes-cobalt nanoparticles in the carbon composition. The x-ray diffraction studies showed the four characteristic reflection values [(002), (100), (004), and (110)] for carbon nanotubes and the pattern for fcc-cobalt nanoparticles. The x-ray (002) reflection for carbon nanotubes was readily apparent.

Example 24

Thermal Conversion of 1/20 Molar $Co_2(CO)_8$/Phthalonitrile/p-BAPS Mixture to Carbon Nanotube-Cobalt Nanoparticle Fibers by Heating to 1500° C.

A samples of the mixture prepared as in Example 19 (500 mg) was mixed and melted with p-BAPS (10 mg) at 180° C.

The resulting sample was placed on a hot plate and heated at 330° C. to a viscous melt followed by the insertion of a glass rod into the sample and the upward drawing of fibers. The diameter of the fibers was controlled as a function of the rate of drawing of the fibers. The drawn fibers were cured or solidified by heating at 280° C. for 12 hr, 300° C. for 2 hr, 350° C. for 3 hr, and 375° C. for 4 hr to form a thermoset fiber, which was carbonized by heating at 2° C./min in a flow of nitrogen. Drawing the fibers at 325° C. permitted the retention of shape during the curing process, which was initiated at a lower temperature (270° C.) so that the fiber would retain its solid shape while curing to a thermoset fiber. The x-ray diffraction and transmission electron microscopy (TEM) studies showed the presence of carbon nanotubes within the fibers. X-ray studies confirmed the presence of carbon nanotubes-cobalt nanoparticles in the carbonized fibers/rods. The x-ray diffraction studies showed the four characteristic reflection values [(002), (100), (004), and (110)] for carbon nanotubes and the pattern for fcc-cobalt nanoparticles. The x-ray (002) reflection for carbon nanotubes was readily apparent.

Example 25

Synthesis of 1/20 Molar $Fe_2(CO)_9$/Phthalonitrile Mixture

The phthalonitrile (200 mg, 0.225 mmol) was dissolved in 10 mL of methylene chloride in a 25 mL round bottomed flask. $Fe_2(CO)_9$ (8.2 mg, 0.0225 mmol) dissolved in 2 mL of hexanes was slowly added and a brown precipitate formed. The solvent was removed under reduced pressure, the mixture vacuum was dried, and the $Fe_2(CO)_9$/phthalonitrile mixture was isolated as a solid.

Example 26

Thermal Conversion of 1/20 Molar $Fe_2(CO)_9$/Phthalonitrile Mixture to Carbon Nanotube-Cobalt Nanoparticle Composition by Heating to 1000° C. and 1500° C.

Samples of the mixture from Example 25 (38.01 mg and 50.26 mg) were heated in a TGA chamber under nitrogen at 10° C./min to 1000° C. and to 1500° C. resulting in a shaped composition and char yields of 47% and 43%, respectively. The DTA curve showed exotherms at 163, 276, 514, and 868° C. during the heat treatment to 1000° C. and to 1500° C. X-ray studies confirmed the presence of carbon nanotubes-iron nanoparticles in the carbon composition. The x-ray diffraction studies showed the four characteristic reflection values [(002), (100), (004), and (110)] for carbon nanotubes and the pattern for fcc-Co nanoparticles. The x-ray (002) reflection for carbon nanotubes was readily apparent.

Example 27

Synthesis of 1/20 Molar Bis(1,5-Cyclooctodiene)Nickel (0)/Phthalonitrile Mixture The phthalonitrile (1.00 g, 1.12 mmol) was dissolved in 25 mL of methylene chloride in a 50 mL round bottomed flask. $Ni[COD]_2$ (27.5 mg, 0.100 mmol) dissolved in 2 mL of methylene chloride was added dropwise and a brown precipitate formed. The solvent was removed under reduced pressure, the mixture vacuum was dried, and the mixture was isolated as a dark brown solid.

Example 28

Thermal Conversion of 1/20 Molar $Ni[COD]_2$/Phthalonitrile Mixture to Carbon Nanotube-Nickel Nanoparticle Composition by Heating to 1000° C.

A sample of the mixture from Example 27 (46.2 mg) was heated in a TGA chamber under nitrogen at 10° C./min to 1000° C. resulting in a shaped composition and a char yield of 50%. X-ray studies confirm the presence of carbon nanotubes-nickel nanoparticles in the carbon composition. The x-ray diffraction studies showed the four characteristic reflection values [(002), (100), (004), and (110)] for carbon nanotubes and the pattern for nickel nanoparticles. The x-ray (002) reflection for carbon nanotubes was readily apparent.

Example 29

Synthesis of 1/20 by Weight $Co_2(CO)_8$/Coal Pitch Mixture

A coal tar pitch (1.18 g) and $Co_2(CO)_8$ (59 mg, 0.172 mmol) were mixed together in 5 mL of methylene chloride. The mixture was stirred for 5 min and the solvent was removed under reduced pressure. The mixture was vacuum dried and the product isolated as a black oil.

Example 30

Heating of 1/20 by Weight $Co_2(CO)_8$/Coal Pitch Mixture to 1100° C. and 1400° C.

Samples of the mixture from Example 29 (45.92 mg and 35.43 mg) were heated at 10° C./min to 1100° C. and to 1400° C. in a TGA chamber under nitrogen resulting in shaped components to afford char yields of 30% and 27%, respectively. X-ray studies confirmed the presence of carbon nanotubes-cobalt nanoparticles in the carbon compositions. The x-ray diffraction studies showed the four characteristic reflection values [(002), (100), (004), and (110)] for carbon nanotubes and the pattern for fcc-cobalt and cobalt oxide nanoparticles. The x-ray (002) reflection for carbon nanotubes was readily apparent.

Example 31

Synthesis of 1/20 by Weight $Co_2(CO)_8$/Petroleum Pitch Mixture

The petroleum pitch (1.05 g) and $Co_2(CO)_8$ (53 mg, 0.154 mmol) were mixed together in 5 mL of methylene chloride. The mixture was stirred for 5 min and the solvent was removed under reduced pressure. The mixture was vacuum dried and the product was isolated as a black oil.

Example 32

Heating of 1/20 by Weight $Co_2(CO)_8$/Petroleum Pitch Mixture to 1000° C. and 1500° C.

Samples of the mixture from Example 31 (52.22 mg and 55.66 mg) were heated at 10° C./min to 1000° C. and to 1500° C. under nitrogen resulting in a shaped component to afford char yields of 29% and 26%, respectively. X-ray studies confirmed the presence of carbon nanotubes-cobalt nanoparticles in the carbon composition. The x-ray diffraction studies showed the four characteristic reflection values [(002), (100), (004), and (110)] for carbon nanotubes and the pattern for fcc-cobalt and cobalt oxide nanoparticles. The x-ray (002) reflection for carbon nanotubes was readily apparent.

Example 33

Synthesis of 1/20 by Weight $Co_2(CO)_8$/Naphthalene-Derived Mesophase Pitch (AR Pitch Resin by Mitsubishi) Mixture The AR pitch resin (1.05 g) and $Co_2(CO)_8$ (53 mg, 0.154 mmol) were mixed together in powdered form and heated to 270° C. with stirring by mechanical means under inert condition. The sample was then cooled to room temperature.

Example 34

Conversion of 1/20 by Weight $Co_2(CO)_8$/Naphthalene-Derived Mesophase Pitch (AR Pitch Resin by Mitsubishi) Mixture to Carbon Nanotubes A Sample (50 mg) of the mixture from Example 33 was oxidatively stabilized in a flow (50 cc/min) of air at 290° C. for 1 hr, cooled and then heated at 10° C./min to 1500° C. under nitrogen. The air stabilization converted the melt to a solid so that the resulting composition retained its structure upon further heating to elevated temperatures. The x-ray diffraction studies showed the four characteristic reflection values [(002), (100), (004), and (110)] for carbon nanotubes and the pattern for fcc-cobalt and cobalt oxide nanoparticles. The x-ray (002) reflection for carbon nanotubes was readily apparent.

Example 35

Direct Formation of Fibers from Melt of 1/20 by Weight $Co_2(CO)_8$/Naphthalene-Derived Mesophase Pitch (AR Pitch Resin by Mitsubishi) Mixture A sample (0.2 g) of the mixture prepared in Example 33 was melted at 290° C. under inert condition and a glass rod was inserted and a fiber was pulled out. This procedure was repeated several times. The fibers were air stabilized by heating under a flow of air at 1° C./min to 290° C. and holding for 1 hr. After cooling, the stabilized fibers were heated and carbonized at 5° C./min to 1500° C. and held at this temperature for 1 hr; the fibers retained their shape. X-ray diffraction studies showed the four characteristic reflection values [(002), (100), (004), and (110)] for carbon nanotubes and the pattern for fcc-cobalt and cobalt oxide nanoparticles. The x-ray (002) reflection for carbon nanotubes is readily apparent. TEM studies also showed the presence of carbon nanotubes. Thus, this experiment showed that fibers can be spun from the melt of such a mixture as Example 33, air stabilized, and converted in situ into carbon nanotube containing fibers. The yields in such fibers would depend on the optimization of the carbonization/graphitization conditions.

Example 36

Fabrication of CNT Fibers from the $Co_2(CO)_8$/ Phthalonitrile/p-BAPS Sample

A sample of the $Co_2(CO)_8$/phthalonitrile mixture from Example 19 (250 mg) and p-BAPS (12.5 mg) were placed in an aluminum pan. The mixture was heated at 350° C. with stirring and held at that temperature until the mixture became too viscous to stir easily. A glass rod was inserted into the mixture and pulled out resulting in the formation of fibers from the surface of the mixture and attached to the glass rod. The diameter of the fibers was controlled by the rate that the fibers were drawn. The polymeric fibers were heat treated at 200° C. for 2 hr, 250° C. for 12 hr in air and 300° C. for 4 hr, 350° C. for 2 hr and 375° C. for 4 hr under argon. Different fibers were then carbonized by heating under nitrogen to 1000° C. and to 1500° C. at 0.3° C./min and holding for 1 hour to produce CNT-containing fibers. Higher yield of CNTs were obtained for the higher temperature treated fibers. It was important that the fibers be initially heated at a temperature below the temperature of the melt so as to convert to a solid thermoset before heat treatment to higher temperatures.

Example 37

Fabrication of CNT Fibers from the 1:20 by Weight $Co_2(CO)_8$/PAN Mixture

A sample of the mixture prepared as in Example 1 (200 mg) was dissolved in DMF (2 mL) by heating at 100° C. until a homogeneous solution was obtained. The mixture was then drawn into a 1 mL syringe and slowly precipitated into water yielding PAN polymeric fibers. The fiber shaped structures obtained were isolated and dried. The shaped solid fibers were oxidatively stabilized by heating at 280° C. for 3 hr so that the fibers would retain their shape and not melt upon further heat treatment at elevated temperatures. Different stabilized fibers were then carbonized by heating under nitrogen to 1000° C. and to 1500° C., respectively, at 0.3° C./min and holding for 1 hour to produce CNT-containing fibers. Higher yield of CNTs were obtained for the higher temperature treated fibers.

Example 38

Fabrication of CNT Fibers from the 1:20 by Weight $Fe_2(CO)_9$/PAN Sample

A sample of the $Fe_2(CO)_9$/PAN mixture prepared as in Example 13 (250 mg) was dissolved in DMF (2 mL) with heating (100° C.) until a homogeneous solution was obtained. The mixture was drawn into a 1 mL syringe and slowly precipitated into water yielding fibers. The fiber shaped structures obtained were isolated, washed several times with distilled water, and dried. The shaped solid fibers were oxidatively stabilized by heating at 280° C. for 2-3 hr so that the fibers would retain their shape and not melt upon further heat treatment at elevated temperatures. Different polymeric fibers were then carbonized by heating under nitrogen to 1000° C. and to 1500° C., respectively at 0.3° C./min, and holding for 1 hour to produce in situ CNT-containing fibers. Higher yield of CNTs were obtained for the higher temperature treated fibers.

Example 39

Synthesis of 1/20 by Weight Ni[COD]$_2$/PAN Mixture

Ni[COD]$_2$ (50 mg, 0.181 mmol) dissolved in 1 mL of methylene chloride was added dropwise to a mixture of PAN (1.00 g) and 30 mL of methylene chloride in a 50 mL round bottomed flask. The PAN did not dissolve. The slurry was allowed to stir for 15 min before the solvent was removed under reduced pressure. The mixture was vacuum dried and isolated as an off-white solid.

Example 40

Thermal Conversion of 1/20 by Weight Ni[COD]$_2$/PAN Mixture to Carbon Nanotube-Nickel Nanoparticle Composition by Heating to 1000° C.

A sample of the mixture from Example 39 (25.23 mg) was heated in a TGA chamber under nitrogen at 10° C./min to 1000° C. resulting in a shaped composition and a char yield of 36%. The DTA curve showed an exotherm at 308° C. X-ray studies confirmed the presence of carbon nanotubes-cobalt nanoparticles in the carbon composition. The x-ray diffraction studies showed the four characteristic reflection values [(002), (100), (004), and (110)] for carbon nanotubes and the pattern for nickel nanoparticles. The x-ray (002) reflection for carbon nanotubes was readily apparent.

Example 41

Large Scale Synthesis of 1/20 by Weight Fe$_2$(CO)$_9$/PAN Mixture

PAN (250 g) and 1500 mL of methylene chloride were added to a 3000 mL three-necked flask with a mechanical stirrer. The mixture was degassed with nitrogen for 30 min. Fe$_2$(CO)$_9$ (12.5 g) was then added which readily dissolved in the methylene chloride forming an orange colored suspension since the PAN did not dissolve. The slurry was allowed to stir for 1 hr before the solvent was removed under reduced pressure. The solid was vacuum dried.

Example 42

Large Scale Synthesis of 1/20 by Weight Co$_2$(CO)$_8$/PAN Mixture

PAN (250 g) and 1500 mL of methylene chloride were added to a 3000 mL three-neck flask with a mechanical stirrer. The mixture was degassed with nitrogen for 30 min. Co$_2$(CO)$_8$ (12.5 g) was then added which readily dissolved in the methylene chloride forming a dark red colored suspension since the PAN did not dissolve. The slurry was allowed to stir for 1 hr before the solvent was removed under reduced pressure. The solid was vacuum dried.

Example 43

Conversion of 1/20 by Weight Fe$_2$(CO)$_9$/PAN Mixture to Polymeric Nanofiber Sheets Samples of the mixture from Example 41 were dissolved in DMF at 80° C. to a desired viscosity and used in electrospinning to obtain random and aligned polymeric (PAN) nanofiber-containing sheets. Various thicknesses (50, 100, and 200 µm) of the sheets (9"×18") were formulated and used for further studies.

Example 44

Oxidative Stabilization of Polymeric (PAN) Nanofiber Sheets Formulated from 1/20 by Weight Fe$_2$(CO)$_9$/PAN Mixture The polymeric nanofiber sheets of Example 43 were oxidatively stabilized by heating at 1.5° C./min to 260° C. and holding at this temperature for 3-5 hr in a flow of air followed by rapid heating (5° C./min) to 300° C. followed by cooling. The color of the sheets changed from off white to a dark tan color.

Example 45

Conversion of the Oxidatively Stabilized Polymeric (PAN) Nanofiber Sheets Formulated from 1/20 by Weight Fe$_2$(CO)$_9$/PAN Mixture to Carbon Nanotube-Containing Nanofiber Carbon Sheets The air stabilized polymeric sheets of Example 44 were heated at 5° C./min to 1000° C. under a flow of nitrogen and held at 1000° C. for 2 hr. During the heat treatment, the polymeric sheet shrunk to about ⅓ of the original size. X-ray diffraction showed that carbon nanotubes were being formed in situ within the nanofibers of the carbon sheets along with some amorphous carbon and iron oxide nanoparticles.

Example 46

Heat Treatment of Carbon Nanotube-Containing Nanofiber Carbon Sheets Formulated from the Oxidatively Stabilized Polymeric (PAN) Nanofiber Sheets to 1500° C.

Samples of the carbon nanotube-nanofiber carbon sheets of Example 45 were further heated at 5° C./min to 1500° C. and held at this temperature for 2 hr under a flow of nitrogen. X-ray diffraction studies showed a large 002 peak at about 25.83 and the peak attributed to the amorphous carbon had been greatly diminished. This study showed that the amount of carbon nanotubes within the nanofibers can be controlled as a function of the heat treatment temperature.

Example 47

Conversion of Sample Formulated from the Large Scale Synthesis of 1/20 by Weight Co$_2$(CO)$_8$/PAN Mixture into Films A sample (0.5 g) of the mixture of Example 42 was dissolved in 25 mL of DMF at 80° C. Upon cooling to ambient conditions, aliquots were poured into distilled water forming solid films. The off white colored films were washed several times with distilled water, collected, and dried.

Example 48

Oxidative Stabilization of Sample (Film) Formulated from 1/20 by Weight Co$_2$(CO)$_8$/PAN Mixture A sample (10 mg) of the off white colored film from Example 47 was heated in a flow of air at 2° C./min to 225°

C. and held at this temperature for 4 hr. The oxidatively heat treatment converted the PAN into an unsaturated conjugated black material; sample lost about 5% weight during the heat treatment.

Example 49

Conversion of Oxidatively Stabilized PAN Film to Co Metal Nanoparticle-Carbon Nanotube Containing Film A sample of the stabilized film from Example 48 (45 mg) was heated in a TGA chamber under flow of nitrogen at 10° C./min to 1300° C. resulting in a shaped composition and a char yield of 50%. At 1000, 1100, and 1300° C., the sample retained about 58, 53, and 59% weight. X-ray studies confirmed the presence of carbon nanotubes-cobalt nanoparticles in the carbon composition of the film. The x-ray diffraction studies showed the four characteristic reflection values [(002), (100), (004), and (110)] for carbon nanotubes and the pattern for fcc-cobalt nanoparticles. The x-ray (002) reflection at about 25.65 for carbon nanotubes is intense and readily apparent. This composition may be suitable for the spinning of fibers, oxidative stabilization, and conversion to carbon and graphite fibers.

Example 50

Conversion of 1/20 by Weight $Co_2(CO)_8$/PAN Mixture

Samples of a mixture as formed in Example 42 are dissolved in DMF to a desired viscosity and used in electrospinning to obtain random and aligned polymeric (PAN) nanofiber-containing sheets. Various thickness (50, 100, and 200 μm) of the sheets (9"×18") and nanofiber diameter sizes are formulated and used for further studies and conversion to carbon nanotubes in situ within the nanofibers of carbon sheets.

Example 51

Oxidative Stabilization of Polymeric (PAN) Nanofiber Sheets Formulated from 1/20 by Weight $Co_2(CO)_8$/PAN Mixture The polymeric nanofiber sheets of Example 50 are oxidatively stabilized by heating at 1.5° C./min to 230-260° C. and holding at the temperature for 3-5 hr in a flow of air followed by rapid heating (5° C./min) to 300° C. followed by cooling. The color of the sheets is expected to change from off white to a dark color.

Example 52

Conversion of the Oxidatively Stabilized Polymeric (PAN) Nanofiber Sheets Formulated from 1/20 by Weight $Co_2(CO)_8$/PAN Mixture to Carbon Nanotube-Containing Nanofiber Carbon Sheets The air stabilized polymeric sheets of Example 51 are heated at 5° C./min to 1000° C. under flow of nitrogen and held at 1000-1200° C. for 2 hr. During the heat treatment, the polymeric sheet is expected to shrink in size. X-ray diffraction studies are expected to show that Co nanoparticle-carbon nanotubes are formed in situ within the nanofibers of the carbon sheets along with some amorphous carbon and Co oxide nanoparticles.

Example 53

Heat Treatment of Carbon Nanotube-Containing Nanofiber Carbon Sheets Formulated from the Oxidatively Stabilized Polymeric (PAN) Nanofiber Sheets to 1500° C.

Samples of the carbon nanotube-nanofiber carbon sheets of Example 52 are further heated at 5° C./min to 1500° C. and held at this temperature for 2 hr under a flow of nitrogen. X-ray diffraction studies are expected to show a large 002 peak at about 25.83 and the peak attributed to the amorphous carbon is expected to be greatly diminished. This study is expected to show that the amount of carbon nanotubes within the nanofibers can be controlled as a function of the heat treatment temperature.

Example 54

Formulation of Wt. % Solutions in DMAC from 1/20 by Weight $Fe_2(CO)_9$/PAN Mixture Varying wt. % polymeric solutions in DMAC were prepared using the $Fe_2(CO)_9$/PAN mixture of Example 41 and thoroughly mixed by heating at 120° C. for 1 hr. It was found that an 18 wt. % solution had the most desirable viscosity value for spinning fibers.

Example 55

Spinning of Fibers from 1/20 by Weight $Fe_2(CO)_9$/PAN in Solution

Polymeric fibers (100 filament tow) were spun using a spinneret from the mixture of Example 54, passed into water, and dried. The color of the fibers/tows was a bit yellow-brown compared to homopolymer PAN, which was white. But this was expected as the $Fe_2(CO)_9$/PAN powder had a darker color relative to pure PAN attributed to the presence of the $Fe_2(CO)_9$.

Example 56

Oxidative Stabilization of the Fibers Spun from a Solution of 1/20 by Weight $Fe_2(CO)_9$/PAN Mixture To oxidatively stabilize the PAN-based fibers formulated in Example 55, the fibers/tows were heated from room temperature to 250° C. at 1° C./min in a flow of air; dwell time at 250° C. was for 5 hr followed by heating at 1° C./min to 300° C. and then cooling back to room temperature. During the heat treatment, the fibers changed in color from light yellow-brown to amber to dark brown to black.

Example 57

Carbonization of the Oxidatively Stabilized Fe-Pan Fibers at 1300° C.

Oxidatively stabilized fibers of Example 56 were mounted onto a graphite rack system and carbonized in a graphitic furnace in inert gas (helium). The stabilized fibers were heated under a constant tension from room temperature to 1300° C. at 10° C./min and allowed to dwell at 1300° C. for 1 hr followed by cooling back to room temperature at 50° C./min. The fibers had weight retention of 49.39%. Scanning electron microscopy studies of the black fibers showed the presence of carbon nanotubes within the fibers that had been formed in situ within the fibers during the carbonization process; the carbon nanotubes were mostly aligned along the direction of the fibers. Transmission electron microscopy studies showed the presence of carbon nanotubes and Fe nanoparticles within the fibers.

Example 58

Graphitization of the Oxidatively Stabilized Fe-Pan Fibers at 2700° C.

Oxidatively stabilized fibers of Example 56 were mounted onto a graphite rack system and graphitized in a graphitic furnace in inert gas (helium). The stabilized fibers were heated under a constant tension from room temperature to 1300° C. at 10° C./min and allowed to dwell at 1300° C. for 1 hr followed by heating at 50° C./min to 2700° C. and dwelling at 2700° C. for 1 hr and cooling back to room temperature at 50° C./min. The fibers had weight retention of 47.77%. Scanning electron microscopy studies of the black fibers showed the presence of carbon nanotube within the fibers that had been formed in situ within the fibers during the carbonization and graphitization processes; the carbon nanotubes were mostly aligned along the direction of the fibers. Transmission electron microscopy studies showed the presence of carbon nanotubes within the fibers.

Example 59

Formulation of Wt. % Solutions in DMAC from 1/20 by Weight $Co_2(CO)_8$/PAN Mixture Varying wt. % polymeric solutions in DMAC were prepared using the $Co_2(CO)_8$/PAN mixture of Example 42 and thoroughly mixed by heating at 120° C. for 1 hr.

Example 60

Spinning of Fibers from 1/20 by Weight $Co_2(CO)_8$/PAN Mixture

Polymeric fibers (100 filament tow) are spun using a spinneret from the mixture of Example 59, passed into water, and dried. The color of the fibers/tows is expected to be white based on the formation of films of Example 47 from the deposition of the solution in water and drying of the films resulting in white film. The white fibers/tows are stabilized in air to convert the polymer into a conjugated system that is expected to retain its structural integrity during carbonization and graphitization.

Example 61

Oxidative Stabilization of the Fibers Spun from a Solution of 1/20 by Weight $Co_2(CO)_8$/PAN Mixture To oxidatively stabilize the PAN-based fibers/tows formulated in Example 60, the fibers/tows are heated from room temperature to 250° C. at 1° C./min in a flow of air; dwell time at 250° C. is for 5 hr followed by heating at 1° C./min to 300° C. and then cooling back to room temperature. During the heat treatment, the fibers/tows are expected to change in color from off-white to amber to dark brown to black.

Example 62

Carbonization of the Oxidatively Stabilized Co-Pan Fibers at 1300° C.

Oxidatively stabilized fibers/tows of Example 61 are mounted onto a graphite rack system and carbonized in a graphitic furnace in inert gas (helium). The stabilized fibers/tows are heated under a constant tension from room temperature to 1300° C. at 10° C./min and allowed to dwell at 1300° C. for 1 hr followed by cooling back to room temperature at 50° C./min. Scanning electron microscopy studies of the black fibers are expected to show the presence of carbon nanotube within the fibers formed in situ within the fibers during the carbonization process with the carbon nanotubes mostly aligned along the direction of the fibers based on the results of Example 49. Transmission electron microscopy studies should show the presence of carbon nanotubes and Co nanoparticles within the fibers as in Example 57.

Example 63

Graphitization of the Oxidatively Stabilized Co-Pan Fibers at 2700° C.

Oxidatively stabilized fibers of Example 61 are mounted onto a graphite rack system and graphitized in a graphite furnace in inert gas (helium). The stabilized fibers are heated under a constant tension from room temperature to 1300° C. at 10° C./min and allowed to dwell at 1300° C. for 1 hr followed by heating at 50° C./min to 2700° C. and dwelling at 2700° C. for 1 hr and cooling back to room temperature at 50° C./min. Scanning electron microscopy studies of the black fibers should show the presence of carbon nanotube within the fibers formed in situ within the fibers during the carbonization and graphitization processes with the carbon nanotubes aligned along the direction of the fibers. Transmission electron microscopy studies are expected to show the presence of carbon nanotubes within the fibers as in Example 58.

Example 64

Synthesis of Metal Salt/Naphthalene-Derived Mesophase Pitch (AR Pitch Resin by Mitsubishi) Mixture Various concentrations of metal salts and/or organometallic compounds/resins such as octacarbonyldicobalt, diironnonacarbonyl, and ferrocene-based materials are mixed with AR pitch resin. The metal salt-AR pitch resin composition are thoroughly mixed in powdered form and heated at an elevated temperature above where the AR pitch resin flows with stirring by mechanical means under inert condition to homogeneously mix. These samples are then cooled to room temperature.

Example 65

Spinning of Fibers from 1/20 by Weight $Co_2(CO)_8$/AR Pitch Resin Mixture

A sample of 1/20 by weight $Co_2(CO)_8$/AR pitch resin mixture of Examples 33 and 64 is used to spin fiber at 300-370° C. through a spinneret. The fibers/filament passes through a nitrogen atmosphere as they leave the spinneret and before being taken up by a reel.

Example 66

Stabilization of the Mesophase AR Pitch Fibers Produced from 1/20 by Weight $Co_2(CO)_8$/AR Pitch Resin Mixture AR pitch fibers produced by Example 65 are stabilized to a thermoset by heating between 250-350° C. in an air atmosphere for 5-60 min. The fibers are oxidatively heated so that they will not soften when heated to carbonization and the fibers should be totally infusible so they will not sag during carbonization.

Example 67

Carbonization of the Mesophase AR Pitch Fibers Derived from $Co_2(CO)_8$/AR Pitch Resin Mixture AR pitch thermosetting fibers produced by Example 66 are carbonized by heating up to 2000° C. in an inert (helium) atmosphere and holding from 5-30 min. Carbon nanotubes are expected to grow in situ within the fibers along with other carbonaceous materials. As carbon nanotubes were observed in Examples 34 and 35 on solid sample and fibers pulled from the melt and carbonized under similar conditions, fibers formed by this procedure using a spinneret (Example 65) should contain carbon nanotubes with the yield dependent on the carbonization temperature. X-ray diffraction, scanning electron microscopy, and transmission electron microscopy studies are used to analyze the fibers for the carbon nanotubes.

Example 68

Spinning of Fibers from 1/20 by Weight $Fe_2(CO)_9$/AR Pitch Resin Mixture

A sample of 1/20 by weight $Fe_2(CO)_9$/AR pitch resin mixture of Example 64 is used to spin fibers at 300-370° C. through a spinneret. The fibers/filaments pass through a nitrogen atmosphere as they leave the spinneret and before being taken up by a reel.

Example 69

Stabilization of the Mesophase AR Pitch Fibers Produced from 1/20 by Weight $Fe_2(CO)_9$/AR Pitch Resin Mixture AR pitch fibers produced by Example 68 are stabilized to a thermoset by heating between 250-350° C. in an air atmosphere for 5-60 min. The fibers are oxidatively heated so that they will not soften when heated to carbonization and the fibers should be totally infusible so they will not sag during carbonization.

Example 70

Carbonization of the Mesophase AR Pitch Fibers Derived from $Fe_2(CO)_9$/AR Pitch Resin Mixture AR pitch thermosetting fibers produced by Example 69 are carbonized by heating up to 2000° C. in an inert (helium) atmosphere and holding from 5-30 min. Carbon nanotubes are expected to grow in situ within the fibers along with other carbonaceous materials. As carbon nanotubes were observed in Examples 34 and 35 on solid sample and fibers pulled from melt and carbonized under similar conditions, small diameter fiber formed by this procedure should also have carbon nanotubes with the yield dependent on the carbonization temperature. X-ray diffraction, scanning electron microscopy, and transmission electron microscopy studies are used to analyze the fibers for the carbon nanotubes.

Example 71

Synthesis of 1/20 by Weight Octacarbonyldicobalt/Polyacrylonitrile DMAC Mixture

Polyacrylonitrile (2.68 g) was dissolved over 2 h in 20 mL of heated dimethylacetamide (DMAC). The mixture was cooled to ambient temperature and $Co_2(CO)_8$ (134 mg, 0.332 mmol) was added. Gentle heating to around 50° C. with stirring dissolved the $Co_2(CO)_8$ resulting in a reddish-brown solution The mixture was used as prepared.

Example 72

Thermal Conversion of 1/20 by Weight Octacarbonyldicobalt/Polyacrylonitrile Mixture to Carbon Nanotube-Cobalt Nanoparticle Composition to 1000° C.

A sample of the mixture from Example 70 was added to distilled water resulting in the deposition of an oft-white solid. The solid was washed several times to remove the solvent and then dried. A sample (50 mg) of the dried sample was heated in a TGA chamber under nitrogen at 10° C./min to 1000° C. resulting in a shaped composition and a char yield of 50%. The DTA curve showed an exotherm at 308° C. X-ray studies confirmed the presence of carbon nanotubes-cobalt nanoparticles in the carbon composition. The x-ray diffraction study showed the four characteristic reflections [(002), (100), (004), and (110)] values for carbon nanotubes and the pattern for cobalt nanoparticles. The x-ray (002) reflection for carbon nanotubes is readily apparent.

Example 73

Fabrication of CNT Fibers from the 1:20 by Weight Octacarbonyldicobalt/Polyacrylonitrile DMAC Mixture The solution from Example 70 (200 mg) was drawn into a 1 mL syringe and slowly precipitated into water. Fiber shaped structures were obtained. The fibers were washed several times with distilled water to remove the solvent and then dried. The shaped solid fibers were oxidatively stabilized by heating in air at 280° C. for 2 h. The fibers were then carbonized by heating under argon to 1000° C. at 0.3° C./min.

Example 74

Synthesis of 1/20 by Weight Diironnonacarbonyl/Polyacrylonitrile DMAC Mixture

Polyacrylonitrile (2.68 g) was dissolved over 2 h in 20 mL of heated dimethylacetamide (DMAC). The mixture was cooled to ambient temperature and Fe$_2$(CO)$_9$ (134 mg, 0.368 mmol) was added. Gentle heating to around 50° C. with stirring dissolved the Fe$_2$(CO)$_9$ resulting in an orange-red solution. The mixture was used as prepared.

Example 75

Thermal Conversion of 1/20 by Weight Diironnonacarbonyl/Polyacrylonitrile Mixture to Carbon Nanotube-Iron Nanoparticle Composition A sample of the mixture from Example 73 was added to distilled water resulting in the deposition of an oft-white solid. The solid was washed several times to remove the solvent and then dried. A sample (43.5 mg) of the dried sample was heated in a TGA chamber under nitrogen at 10° C./min to 1000° C. resulting in a shaped composition and a char yield of 48%. The DTA curve showed an exotherm at 310° C. X-ray studies confirmed the presence of carbon nanotubes-iron nanoparticles in the carbon composition. The x-ray diffraction study showed the four characteristic reflections [(002), (100), (004), and (110)] values for carbon nanotubes and the pattern for iron nanoparticles. The x-ray (002) reflection for carbon nanotubes is readily apparent.

Example 76

Fabrication of CNT Fibers from the 1:20 by Weight Diironnonacarbonyl/Polyacrylonitrile DMAC Mixture The solution from Example 73 (500 mg) was drawn into a 1 mL syringe and slowly precipitated into water. Fiber shaped structures were obtained. The fibers were washed several times with distilled water to remove the solvent and then dried. The shaped solid fibers were oxidatively stabilized by heating in air at 280° C. for 2 h. The fibers were then carbonized by heating under argon to 1000° C. at 0.3° C./min.

Obviously, many modifications and variations are possible in light of the above teachings. It is therefore to be understood that the claimed subject matter may be practiced otherwise than as specifically described. Any reference to claim elements in the singular, e.g., using the articles "a," "an," "the," or "said" is not construed as limiting the element to the singular.

What is claimed is:

1. A carbon nanotube-containing fiber made by a method comprising:
   providing a material selected from an aromatic polymer and a precursor of an aromatic polymer;
   providing an amount of a transition metal compound;
   dissolving the material and the amount of the transition metal compound in a solvent to produce a solution;
   producing a fiber from the solution;
     wherein the fiber is formed using a spinneret or by electrospinning; and
   heating the fiber under conditions effective to form the carbon nanotube-containing fiber comprising carbon-nanotubes aligned in the same direction as the fiber.

2. The carbon nanotube-containing fiber of claim 1, wherein the solvent is a polar aprotic solvent.

3. The carbon nanotube-containing fiber of claim 1, wherein the carbon nanotubes are formed by heating the fiber in an inert atmosphere to a temperature of 600-2700° C.

4. The carbon nanotube-containing fiber of claim 1, wherein the method further comprises:
   heating the fiber under conditions effective to convert the material to an aromatic polymer before heating to form the carbon nanotube-containing fiber.

5. The carbon nanotube-containing fiber of claim 4, wherein the material is polyacrylonitrile.

6. The carbon nanotube-containing fiber of claim 4, wherein the material is a coal pitch polymer, a petroleum pitch polymer, or a pitch resin polymer.

7. The carbon nanotube-containing fiber of claim 4, wherein the material is converted to the aromatic polymer by heating in the presence of oxygen to a temperature of 200-300° C.

8. The carbon nanotube-containing fiber of claim 1, wherein the material is a phthalonitrile polymer or thermoset thereof.

9. The carbon nanotube-containing fiber of claim 8, wherein the phthalonitrile polymer is formed from wherein n is a positive integer.

10. The carbon nanotube-containing fiber of claim 1, wherein the transition metal compound is octacarbonyldicobalt, 1-(ferrocenylethynyl)-3-(phenylethynyl)benzene, diironnonacarbonyl, or bis(1,5-cyclooctodiene)nickel(0).

11. The carbon nanotube-containing fiber of claim 1, wherein the fiber further comprises metal nanoparticles.

12. The carbon nanotube-containing fiber of claim 1, wherein the carbon nanotube-containing fiber is a component of a nanofiber sheet.

13. The carbon nanotube-containing fiber of claim 1, wherein the fiber is produced when at least 50% of the amount of the transition metal compound remains in the solution.

14. The carbon nanotube-containing fiber of claim 4, herein the material is a coal pitch polymer.

15. The carbon nanotube-containing fiber of claim 1, wherein the material is polyacrylonitrile, a phthalonitrile polymer or thermoset thereof, a coal pitch polymer, a petroleum pitch polymer, or a pitch resin polymer.

16. The carbon nanotube-containing fiber of claim 1, wherein the heating is performed with the fiber under tension.

* * * * *